Figure 1:
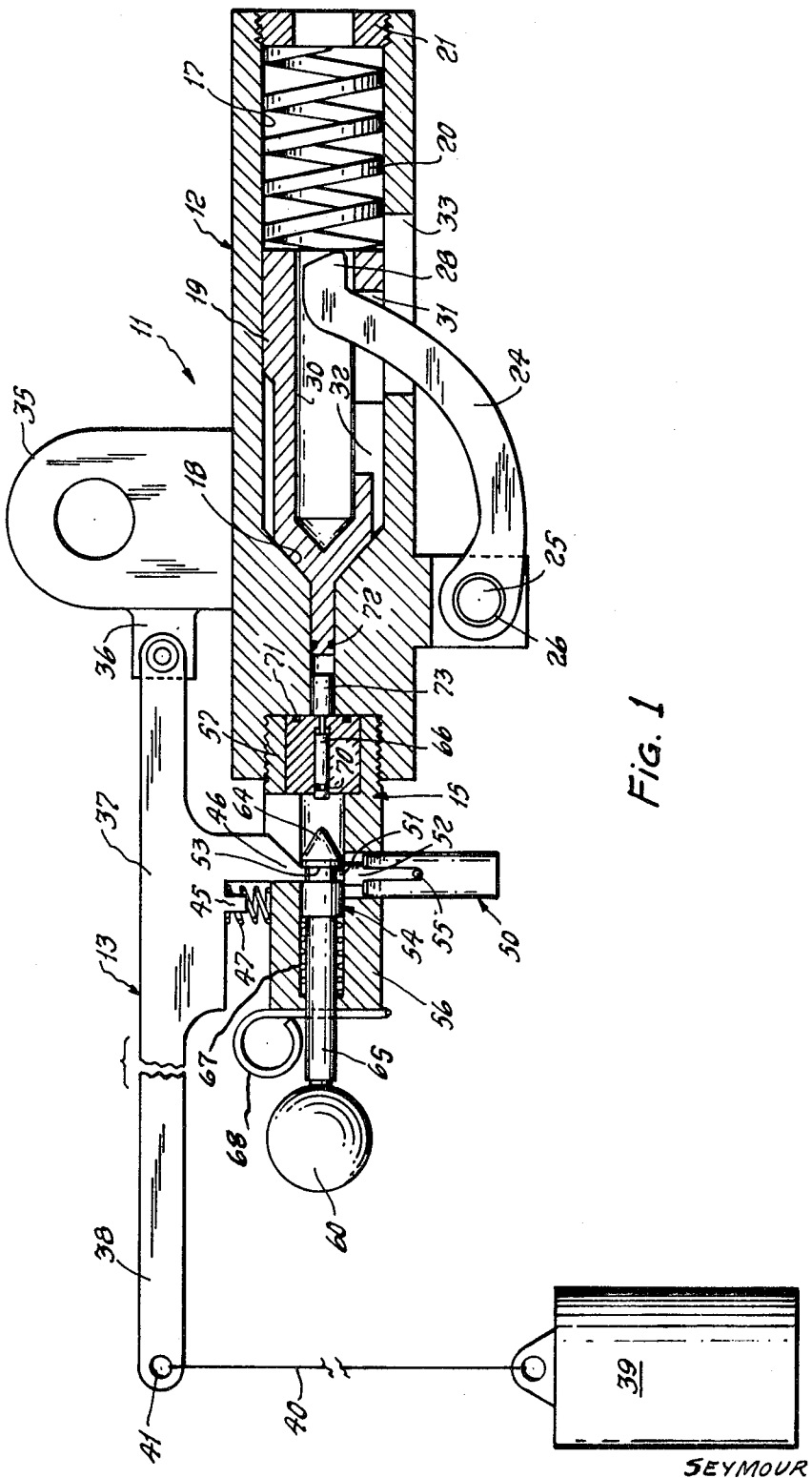

United States Patent

[11] 3,623,759

| [72] | Inventors | Seymour Adler<br>Oxon Hill, Md.;<br>Jason H. Taylor, Alexandria, Va. |
|---|---|---|
| [21] | Appl. No. | 16,449 |
| [22] | Filed | Mar. 4, 1970 |
| [45] | Patented | Nov. 30, 1971 |
| [73] | Assignee | The United States of America as represented by the Secretary of the Navy |

[54] OCEANOGRAPHIC RELEASE HOOK
7 Claims, 2 Drawing Figs.

[52] U.S. Cl. .................................................. 294/83 AE
[51] Int. Cl. .....................................................B64d 17/38,
B66c 1/36
[50] Field of Search .......................................... 294/83, 84,
83.1 ER

[56] References Cited
UNITED STATES PATENTS
3,228,332  1/1966  Snyder ......................... 294/83 X
3,130,703  4/1964  Thompson ..................... 294/83 X
3,348,870  10/1967 Zern ............................. 294/83 X FOREIGN PATENTS
3,305  1/1914  Great Britain ................. 294/84

Primary Examiner—Harvey C. Hornsby
Assistant Examiner—Merle F. Maffei
Attorneys—R. S. Sciascia, L. I. Shrago and C. E. Vautrain, Jr.

ABSTRACT: A direct-action release means primarily for use with free-fall-type ocean bottom corers which includes a spring-loaded, cartridge-actuated piston that supports the load and frees a hook when a trip weight reaches the bottom is disclosed. Pressure from an exploded cartridge displaces the piston which supports the free end of the release hook, permitting that end to fall out of a slot in the piston and release the equipment suspended from the hook.

OCEANOGRAPHIC RELEASE HOOK

The invention described herein may be manufactured and used by or for the Government of the United States of America for governmental purposes without the payment of any royalties thereon or therefor.

The present invention concerns ocean release and retrieval devices and, more particularly, such devices wherein the object to be deployed and recovered is positively controlled by direct suspension from the actuated release member.

Release hooks for handling coring and other equipment which is lowered or dropped to the ocean floor and recovered are a critical part of oceanographic equipment. In the past some problems in safety as well as in handling excessive weights in the equipment to be dropped have been encountered. Specifically, most conventional release hooks used with coring equipment rely upon a friction clamp on a wire cable, this clamp being designed to produce sufficient friction to hold equipment of a selected weight. However, when the weight is increased or when the equipment is suspended during rolling of the ship, the release hook can be subjected to greater resistance than it can accept. This greater resistance occurs, of course, because of acceleration during the upward movement on the side at which the equipment is suspended and also due to reversal of motion at the low point of the cycle occasioned by ship motion.

The present invention avoids all disadvantages cited above, among others, and provides a pivotable release hook from which the equipment is suspended. The movable hook end rests upon an inner surface of the piston so that the hook is positively prevented from movement regardless of the weight or friction applied to it until the piston is actuated by the firing of a blank cartridge.

Accordingly, it is an object of the present invention to provide a lightweight suspension and release means for equipment of various weights which is unaffected by ship motion and cannot be released prematurely.

Another object of the invention is to provide a release hook wherein the weight of the suspended member is directly carried by the member actuating the hook.

A further object of the invention is to provide a release means for suspending and releasing oceanographic equipment which is not dependent upon friction for its braking effort and which is positive in operation.

Figure 2:
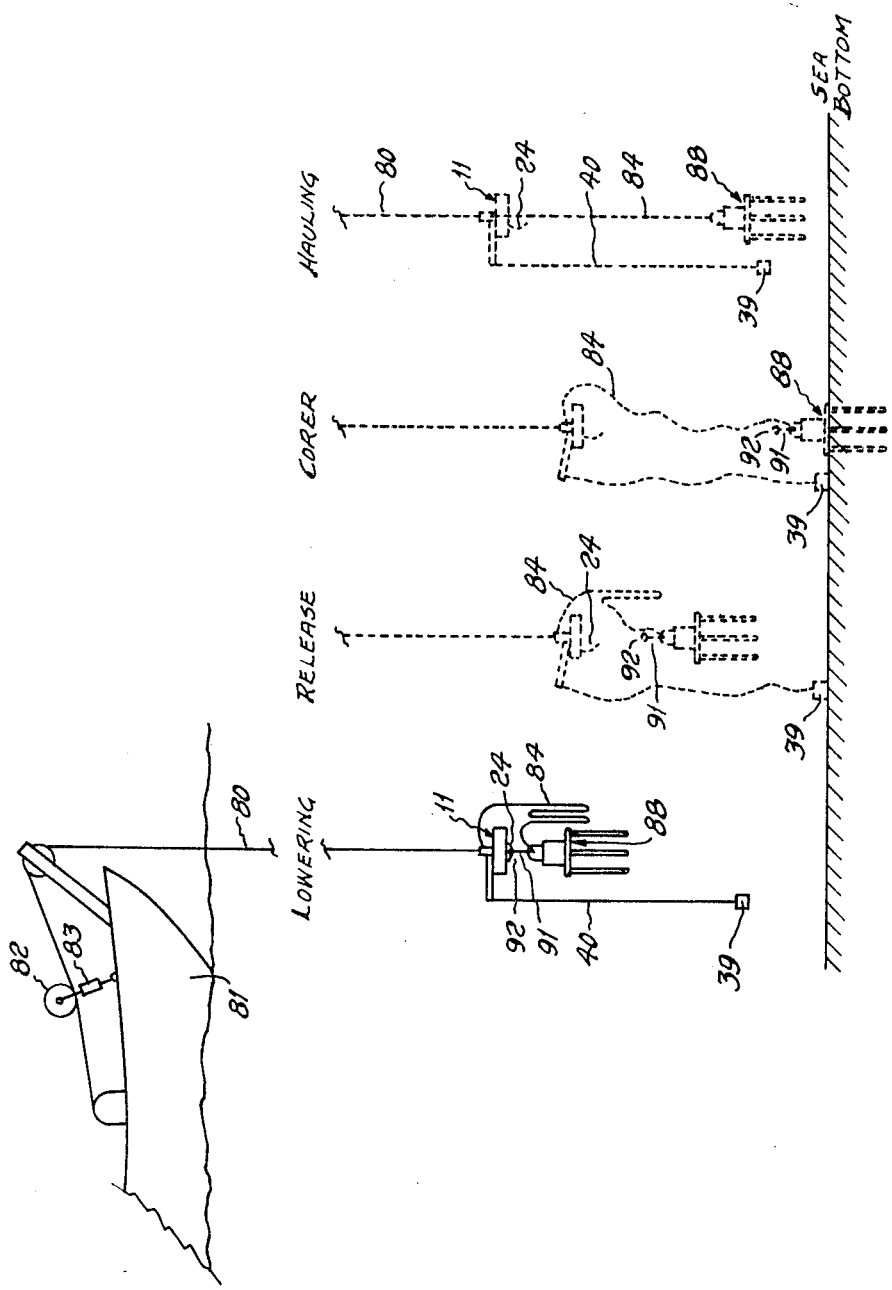

Other objects, advantages and novel features of the invention will become apparent from the following detailed description thereof when considered in conjunction with the accompanying drawings in which like numerals represent like parts throughout and wherein:

FIG. 1 is a side elevation partly in section of the release means of the present invention; and FIG. 2 is a schematic diagram showing the sequential steps in operation of the release means of FIG. 1.

Referring to the embodiment illustrated in FIG. 1, there is shown an equipment release means 11 which includes a housing 12 for containing the release mechanism, a trigger assembly 13 for controlling the time of release and a striker assembly 15 connecting the trigger assembly to the housing. Housing 12 is provided with a major chamber 17 preferably of uniform diameter which is tapered at one as indicated at 18 to receive in close fit the oppositely tapered end of a piston 19. The piston is held in abutting relationship with the housing in the ready condition by a spring 20 which is restrained at its opposite end by a spring retainer 21. A release hook 24 is pivotally attached at one end to housing 12 on a pin 25 and a bushing 26. The hook 24 is arcuate as indicated and preferably terminates in a turned end 28 which end is adapted to contact piston 12 along a matching surface. Piston 12 is provided with a central cavity 30 and is cut away along its lower wall as indicated at 31 and 32 to receive and permit passage of the out-turned end 28 of release hook 24. In the normally closed or inoperative position shown in FIG. 1, opening 31 is displaced to the left so that the end 28 of hook 24 is prevented from passing through a corresponding opening 33 in housing 12.

Secured to housing 12, preferably on the side opposite to the point of attachment of hook 24, is a shackle block 35 by which the device and the equipment to be lowered are suspended from a ship or platform by cable as shown in FIG. 2. A pawl pivot block 36 is secured to shackle block 35 and supports a trigger pawl 37 which preferably is made from flat stock. Pawl 37 has an elongate arm extension 38 which is deployed a desired distance beyond striker guide 15 so that a trip weight 39 may be suspended at the end of the arm clear of the equipment. Weight 39 is suspended by a cable 40 which is rotatably mounted at the end of arm 38 on a pin 41. Extending from pawl 37 downward toward striker guide 15 are a spring retaining pin 45 and a safety lock extension and stub 46. Pin 45 receives a spring 47 for effecting upward displacement of pawl 37 upon tension being relieved from cable 40. Spring 47 abuts against the upper surface of striker guide 15. At a position opposite to that of safety lock 46, a hydrostatic safety means 50 is provided which includes a lock pin 51 that is an extension of a hydrostatic safety plunger 52. Pin 51 is inserted in the lower end of a vertical bore 53 in a hammer 54 while safety lock 46 is inserted in the upper end of the bore. A spring, not shown, holds pin 51 in bore 53 while a shearable wire 55 and the spring prevent movement of plunger 52 away from hammer 54 until the occurrence of sufficient hydrostatic pressure on pin 51 to shear wire 55 and force pin 51 out of bore 52.

Striker guide 15 includes a cylindrical body 56 having an enlarged cavity at one end for receiving a firing pin guide 57 and an intermediate cavity for receiving the hammer 54. Hammer 54 is provided with a round knob 60 at one end and a hammerhead 64 at the other, the hammerhead having a greater diameter than the diameter of an intermediate shaft portion 65 and having a blunt nose for striking a firing pin 66 which is received in sealing engagement in guide 56. Hammer 54 is spring loaded in the ready position by a spring 67 which is selectively compressed to provide a desired striking force when the various safety connections have been removed. These safety connections include the pawl stub 46, the hydrostatic safety pin 51 and a manual safety pin 68 which is in the form of a wire with a hook end for removal by finger pull. Firing pin 66, firing pin guide 56 and piston 19 are provided with O rings 70, 71 and 72, respectively, to prevent sea water from reaching cartridge 73 and the void separating the cartridge and piston 19.

Referring to FIG. 2, operation of the device is shown in sequential steps identified as lowering, release, corer and hauling. In the lowering step, the release means 11 is suspended by a cable 80 from a ship 81, cable 80 riding under an idler sheave 82 and the tension on the cable being measured by a dynamometer 83. In addition to release means 11 being attached to cable 80, a corer retrieval line 84 also is secured at the eye in shackle block 35 at one end and to equipment to be released such as a corer 88 at its other end. The length of retrieval line 84 is sufficiently in excess of the distance from the release means at the time of release to the bottom to permit slack in the retrieval line after the corer has been released. Corer 88 is releasably suspended from release hook 24 by a cable 91 and a shackle 92, the corer in this example being a three-prong cavity corer which is adapted to be implanted in the ocean bottom. As shown in the lowering and release steps, trip weight 39 and its suspending cable 40 are deployed free of corer 88 so that in lowering the entire assembly the trip weight will first reach the bottom, releasing the corer at the selected distance represented by the length of cable 40. Release is effected only after hydrostatic pin 51 and manual safety 68 have previously been withdrawn from bore 53. In this condition, i.e., after the weight of trip weight 39 has been relieved from cable 40, spring 47 forces pawl 37 upward, disengaging pin 46 from hammer 54. Hammer 54 is now free to move under the impetus of the compressive force of spring 67, causing hammerhead 64 to strike firing pin 66 which, in turn, strikes and detonates cartridge 73. The explosive force caused by detonation of cartridge 73 is exerted against the adjacent end of piston 19, displacing the piston as well as opening 31 therein to the right so that release hook 24 is free to move out of housing 12. The weight of corer 88 on hook 24 causes the free end of the hook to be removed instantaneously from housing 12 upon piston 19 being displaced a selected distance. This displacement of piston 19 is accomplished against the compression of spring 20 so that after displacement of piston 19 and freeing of hook 24 the piston is returned to the position shown in FIG. 1.

After the cartridge has been fired and release hook 24 has been freed, the condition shown in the release step in FIG. 2 exists wherein corer 88 is en route downward toward the ocean floor. In the corer step, the corer is implanted in the bottom while still connected to the shackle block of the release means by the retrieval line and weight 39 is still connected to the pawl arm extension by cable 40. The hauling step of FIG. 2 shows the recovery of release means 11, corer 88 and trip weight 39 after completion of the operation.

The cartridge-actuated release means of the present invention thus provides a positive or direct connection from the payload to the cable suspending the assembly from the ship or platform in that the payload is precluded from being released prematurely because the weight of the payload is borne by the actuated member. This member is held in the closed or inoperative position by a spring under compression, thus assuring against accidental or inadvertent release. The hydrostatic safety 55 may be set for any desired depth range merely by inserting a shear wire of appropriate diameter through plunger 52. An additional hydrostatic safety, not shown, may be inserted through pawl 37 at a convenient position preferably adjacent to pin 45 to ensure against accidental firing through shearing of wire 55 during handling or under other conditions. The release means is very light in weight compared to conventional release hooks of similar capacity, a unit weight 35 lb. having been operated satisfactorily with payloads of from 50 lb. to 2,000 lb.

Obviously many modifications and variations of the present invention are possible in the light of the above teachings. For example, end 28 of release hook 24 could rest upon a portion of the base of a pivoted vertical member which base upon actuation of the device would be displaced laterally to release end 28; and trip weight 39 may be replaced by a weighted water sampling container or other utility-oriented weight means.

What is claimed is:

1. A release means for use with oceanographic equipment comprising:
   an elongate hollow housing adapted to receive therein a piston having a large diameter at one end and a smaller diameter at the other end;
   an arcuate release hook pivotally attached at one end exteriorly to said housing and having an outwardly turned portion at its other free end, said release hook mounted on said housing with its arc concave with respect to said housing;
   a piston axially slidable in said housing,
      resilient means in said housing disposed at the large diameter end of said piston maintaining contact between said housing and the smaller diameter end of said piston,
      said housing and said piston having openings in the walls thereof to accommodate the free end of said release hook,
         said release hook in the inoperative condition having its free end blocked by said piston and in the operative condition having its free end released upon movement of said piston against said resilient means;
   means connected to said housing at said smaller diameter end for effecting axial movement of said piston under selected conditions to release the free end of said release hook; and
   means secured to said housing opposite said release hook for suspending said release means from an object.

2. The release means as defined in claim 1 wherein said means for suspending the release means is a shackle block and the release hook is mounted on a hook block secured to the outer surface of said housing,
   said means for effecting axial movement including detonating means disposed in said housing opposite said smaller diameter end of said piston;
   a firing pin positioned in said housing opposite said detonating means,
      said firing pin mounted in a firing pin guide secured to said housing opposite said detonating means;
   a striker guide receiving said firing pin guide and coaxially secured to said housing; and
   a hammer and hammer actuating means mounted in said striker guide for initiating detonation of said detonating means.

3. The release means as defined in claim 2 and further including a trigger lever pivotally mounted on said shackle block,
   said trigger lever extending parallel to the axis of said housing and terminating at a point substantially beyond said hammer and said striker guide;
   a trip weight rotatably suspended from the end of said trigger lever remote from said housing;
   said trigger lever having hammer restraining means removably inserted in said hammer for preventing release of said hammer until selected conditions exist; and
   trigger lever resilient means disposed between said striker guide and said trigger lever,
      said trigger lever resilient means compressed while the weight of said trip weight is carried by said trigger lever and freeing said hammer when the tension caused by said weight is removed from said trigger lever.

4. The release means as defined in claim 3 and further including a manual safety pin and a hydrostatic safety means,
   said manual safety pin removably inserted in said hammer and abutting against said striker guide in the operative condition, preventing actuation of said hammer until removed; and
   said hydrostatic safety means including a pin which prevents release of said hammer when inserted therein,
      said hydrostatic safety pin restrained by a shearable retaining means adapted to shear at a selected pressure, causing said hydrostatic safety pin to be removed from said hammer.

5. A release device for controlling the release of oceanographic equipment at various depths comprising
   a hollow cylinder adapted to carry the weight of oceanographic equipment,
      said cylinder including means on its upper side for attachment to an equipment lowering device and means on its lower side for releasably suspending equipment,
      said release means including an appendage on said cylinder and an arm pivoted at one end about said appendage,
      said arm formed to provide a supporting surface at the other end;
   a movable means accommodated in said cylinder and adapted to receive the supporting surface of said other end of said arm; and
   means in said cylinder mounted in juxtaposition with said movable means for displacing the movable means under the occurrence of selected conditions,
      said arm arcuate with the curve thereof concave with respect to said housing to facilitate release and outturned at said other end to form the supporting surface,
      said housing having an opening in the undersurface thereof positioned to admit a substantial portion of the free end of said arm,
      whereby at release the means supporting the other end of said arm is removed, permitting the arm to pivot and the equipment to descend in free fall,
      said supporting means is a piston having an opening in the sidewall thereof to admit the free end of said arm, and said displacing means is a detonating means positioned in said housing for effecting displacement of said piston upon the occurrence of said selected conditions, said out-turned end of said arm in the unactuated condition supported by the sidewall of said piston.

6. The release device as defined in claim 5 and further including a pawl extending outward from said means for attachment;
- a firing pin mounted in said housing in axial alignment with said detonating means;
- a hammer mounted in spring-loaded relationship in said housing axially aligned with and spaced from said firing pin;
- a tripping means suspended from the remote end of said pawl, said pawl having a tab depending therefrom and removably engaged in said hammer; and
- safety means removably engaged in said hammer for preventing release of said hammer until the occurrence of selected conditions.

7. The release device as defined in claim 6 wherein said safety means include a removable manual safety pin abutting said housing in the ready condition;
- a hydrostatic safety removably received at one end in said hammer in the armed condition;
- a mechanical safety integral with said pawl and removably received in said housing opposite said hydrostatic safety in the armed condition; and
- resilient means compressed between said pawl and said housing in the armed condition,
    - whereby after removal of said manual safety pin the release device is armed and then actuated upon release of said hydrostatic safety at a selected depth and release of said mechanical safety upon removal of the weight of said tripping means from the end of said pawl.

* * * * *